United States Patent [19]

Marshall et al.

[11] Patent Number: 4,577,489
[45] Date of Patent: Mar. 25, 1986

[54] DETECTING LEAKS

[75] Inventors: Peter E. G. Marshall, Stratford-Upon-Avon; Francis R. Piper, Evesham; John F. Wilson, Thornbury, all of United Kingdom

[73] Assignee: BL Technology Limited, Great Britain

[21] Appl. No.: 571,665

[22] Filed: Jan. 17, 1984

[30] Foreign Application Priority Data

Jan. 19, 1983 [GB] United Kingdom ............... 8301407

[51] Int. Cl.$^4$ ............................................. G01M 3/04
[52] U.S. Cl. ................................................... 73/40.7
[58] Field of Search ................. 73/40.7, 46, 49.2, 49.3

[56] References Cited

U.S. PATENT DOCUMENTS 3,302,449  2/1967  Roberts ..................... 73/40.7
4,477,986  10/1984 Marshall et al. ............ 73/40.7
4,478,096  10/1984 Heilard et al. ........... 73/40.7 X

FOREIGN PATENT DOCUMENTS 0064880 11/1982 European Pat. Off. .
711402   2/1980  U.S.S.R. .
1052904  7/1982  U.S.S.R. .
974177  11/1982  U.S.S.R. .

OTHER PUBLICATIONS

Instruments & Experimental Techniques, vol. 19, No. 6, Nov./Dec. 1976, pp. 1734–1736, Plenum Publishing Corp., N.Y. US, V. F. Rogal, et al., "Jet Probe of a Halide Leak Detector".

Primary Examiner—Thomas Wyse
Attorney, Agent, or Firm—Thomas J. Greer, Jr.

[57]                ABSTRACT

The leak detector comprises an annular chamber 11 which leads to a circumferential orifice 14 which in turn leads to an annular duct 21 which is symmetrical about the axis of the detector. Barrier gas is fed to the annular chamber 11, for example from an annular chamber 18 and emerges from the opening 20 to form a substantially laminar flow. Leaks are detected by means of a signal gas within an enclosure at a pressure slightly in excess of ambient, and the signal gas is detected from leaks via a probe 2 which is connected for example to a mass spectrometer. The curtain 1 is stable and enables uneven surfaces to be tracked.

12 Claims, 2 Drawing Figures

DETECTING LEAKS

This invention relates to leak detection and especially to leak detection involving the detection of a signal gas contained in an enclosure and at a pressure in excess of ambient, for the purpose of detecting imperfect seals and seams in the enclosure.

For the purpose of distinguishing between signal gas emerging from a leak and signal gas which may have built up in the area of the enclosure being tested from other leaks, it has been proposed to provide a sampling probe and a circular opening surrounding the probe through which circular opening a barrier gas can be fed. (USSR Inventor's Certificate No. 264744, United Kingdom Patent Application No. 1533013 and the Applicants' European Patent Application No. 0064880). However, these proposals have not proved to be entirely satisfactory in that the gas curtain emerging from the circular opening would have weak points in it and would not be stable.

The invention provides a leak detector having a probe and a circular opening surrounding the probe through which circular opening a barrier gas can be fed, wherein there is provided: an annular chamber having a plurality of inlet ports for entry of barrier gas spaced around its circumference or a continuous inlet port around its circumference and having a plurality of outlet ports spaced around its circumference or a continuous outlet port around its circumference, the inlet and outlet port(s) being such that the barrier gas cannot flow along a straight path directly from the inlet to the outlet port(s); a circumferential orifice, coaxial with the annular chamber, which communicates with the outlet port(s); and an annular duct; coaxial and in communication with the circumferential orifice, which is symmetrical about the axis of the duct, and which defines the circular opening.

The provision of the annular duct, orifice and chamber enable a continuous and uniform curtain of barrier gas to be achieved.

Advantageously the barrier gas flow path turns through at least 90, preferably through at least 180 in passing from the inlet port(s) to the outlet port(s) of the first-mentioned annular chamber.

Advantageously the width of the circumferential orifice is less than 50 thousandths of an inch, and preferably greater than 10 thousandths of an inch. This assists in equalising the mass flow rate around the circumference of the annular duct where the barrier gas enters.

Such orifice dimensions are appropriate to a duct whose axial length is greater than 2 inches, and preferably less than 6 inches, to enable laminar flow to be established at the circular outlet opening. They are also appropriate to an opening whose width lies between 2 and 4 millimeters.

Advantageously, the circumferential orifice faces a cylindrical or conical surface normal to the orifice where it opens into the annular duct. This serves to induce turbulence in the barrier gas after it emerges from the circumferential orifice, and hence further improve annular distribution.

Advantageously, there is provided a second annular chamber having one or more inlet ports and a plurality of outlet ports spaced around its circumference or a continuous outlet port around its circumference, the second annular chamber being coaxial with and in communication with the first annular chamber. This enables all parts of the circumference of the first-mentioned annular chamber to be fed at constant pressure, even though the supply of barrier gas may be fed to the second annular chamber via a single port.

Advantageously, the duct tapers over at least part of its length towards the circular opening; this enables a shorter length of duct to be used while still obtaining the desired flow conditions.

Leak detectors and a method of detecting leaks in accordance with the invention will now be described by way of example with reference to the accompanying drawings, in which.

Both leak detectors are intended to be used for the detection of leaks from an enclosure which contains signal gas at a pressure slightly in excess of ambient. The detector is moved over the surface of the enclosure within a range of heights (2–25 mm) from the surface.

Figure 1:
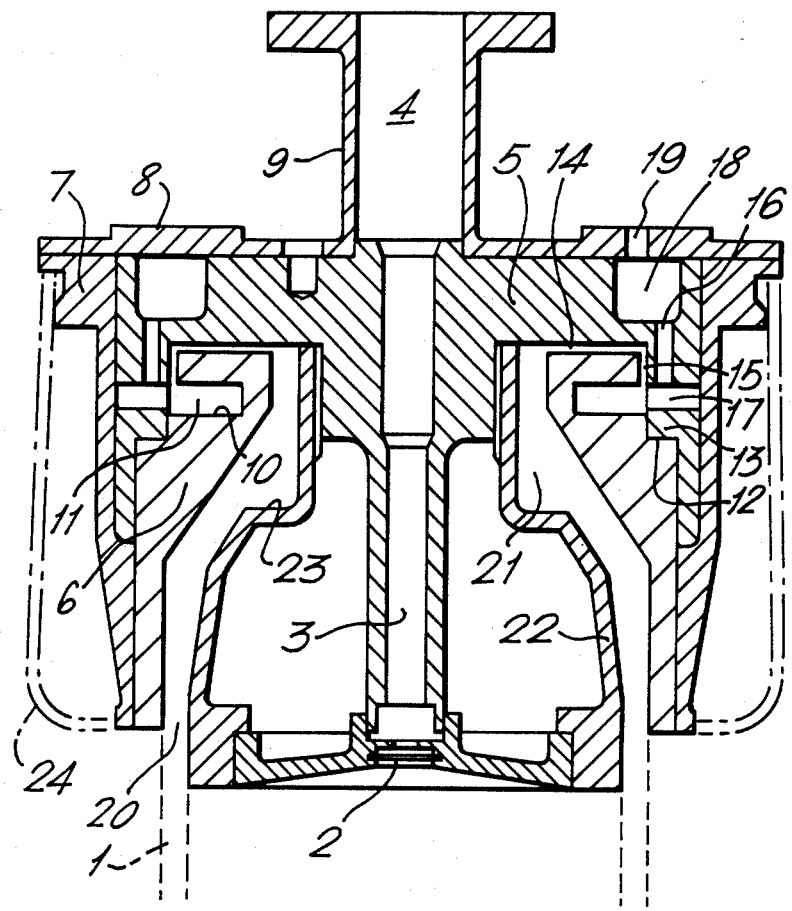
FIG. 1 is an axial cross-section through a first leak detector.

Referring to FIG. 1, a curtain of barrier gas 1 surrounds a probe 2 in the end of the detector, which probe is a capillary tube, connected by a flexible hose, running through the passages 3 and 4, to a detection system for the signal gas.

In both examples, the barrier gas is air and the signal gas is air to which a small amount of helium has been added, and in each case a mass spectrometer is used for detecting the helium. Other signal gasses and barrier gasses can of course be used.

The leak detector in FIG. 1 comprises a body 5 to which an inner sleeve 6 and an outer sleeve 7 are secured. The top of the body is closed by means of an end plate 8 which is formed integrally with a tube 9 which defines the passage 4.

The inner sleeve 6 has a square sectioned groove 10 cut out from it, which extends all the way around the circumference of the inner sleeve, and defines a first annular chamber 11.

The distance between the top of the inner sleeve and the adjacent surface of the body is carefully controlled by means of abutting surfaces 12 on the sleeve and 13 on the body in order to define a circumferential orifice 14 which communicates via annular passage 15 with the first annular chamber 11.

Barrier gas is fed into the first annular chamber 11 by means of right angled drillings 16, 17 in the body, four of which are evenly spaced around the circumference of the body and communicate with square sectioned groove 18 in the top face of the body. Inlet 19 connects to a source of compressed gas.

The purpose of the orifice 14 and of the tortuous path which the barrier gas must take before it reaches the orifice 14 is to ensure that barrier gas emerging from the orifice 14 and entering annular duct 21 has an equal mass flow rate around the entire circumference of the annular duct 21.

It will be noted that in order to pass from second annular chamber 18 to annular orifice 14 the barrier gas has to pass through drilling 16, turn a right angle into drilling 17, a further right angle into passage 15 and a further right angle into orifice 14. Finally, the gas stream emerging from orifice 14 projects directly into a cylindrical wall normal to the gas flow.

The second annular chamber 18 acts like a manifold to distribute pressure equally around the drillings 16 so that barrier gas if fed at equal pressure along all points to the inlet ports of first annular chamber 11.

After passing through the orifice 14, the barrier gas passes down duct 21 the outer wall of which is defined by the inner sleeve 6 and the inner wall of which is defined by means of a hollow insert 22. The duct 21 is symetrical about the axis of the detector, that is, the duct can be generated by any axial section of the duct when swept in a circle about the axis of the detector. The outer surface of the duct 21 has a frusto-conical portion of semi-angle approximately 30 degrees and the inner surface of the duct over this region has a shoulder 23. Lower down the outer surface of the duct is cylindrical and over this region the inner surface is frusto-conical with a semi-angle of around 5 degrees to 10 degrees. The surfaces of the duct are smooth.

The configuration of the duct is such as to produce substantially laminar flow from the circular opening 20 even though the flow after the orifice 14 is turbulent. Laminar flow means that at any point around the circumference of the opening 20, the velocity profile across the width of the curtain is always positive and reduces gradually from the centre of the curtain to the sides.

Because equal mass flow rate enters the duct around its circumference, the velocity profile is also substantially the same around the entire circumference of the curtain. Consequently the curtain has no weak points or local disturbances in it and is of equal strength around its circumference.

The configuration is also such that the stagnation pressure is equal around the circumference of the curtain. The stagnation pressure is the pressure that results from the velocity of the gas. If a pressure sensor was inserted into the curtain facing towards the opening 20, and another pressure sensor was inserted close by but at right angles to the velocity of the curtain, the reading of the first sensor would be slightly greater than that of the second, due to the velocity of the gas. That difference is the stagnation pressure. The reading of the second sensor is of course atmospheric pressure. The leak detector is such that the stagnation pressure is low but equal around all points on the circumference of the curtain.

It has been found that the shoulder 23, which forms a region of locally increased diameter of the duct, is important in producing the desired laminar flow.

The tapering of the duct has the effect of allowing a shorter duct to be used than would otherwise be the case.

For the embodiment illustrated in FIG. 1, typical dimensions are as follows: diameter of curtain, 4 inches; axial length of duct, 4 inches; width of orifice 14, between 10 and 50 thousandths of an inch, width of curtain, between 2 and 4 millimeters. The operating height of the detector from the surface is 2-25 millimeters.

The compressed air supply may be in the region of 5 to 20 pounds per square inch. Lower pressures could be used if it is conducted along larger diameter tubes. The probe 2 and flexible hose assembly is evacuated by an auxillary pump, which ensures the rapid transfer of the signal gas when present into the analyser for detection by the mass spectrometer. The mass spectrometer pressure is in the range of 10 −4 to 10 −5 millibar. It is possible that results could be achieved without any suction along the capillary tube because the pressure within the curtain 1 will be slightly in excess of atmospheric due to the effect of the barrier gas defining a closed volume with the surface to be tested but the response will be considerably slower.

A flexible rubber sleeve 24 may be secured to the outside of the outer sleeve 7 and connected up to a suitable detector for detecting low pressure pulses: alternatively strain gauges could be used. The purpose in either case is to provide warning if the detector strikes an object.

The detector may be used for detecting leaks from a vehicle such as where seals have been incorrectly applied or where seams have been badly welded or sealed and is very suitable for this purporse because of the stability of the curtain. It will be apparent that, in tracking for example the door seal on a vehicle the surface in the region of the door seal will be anything but flat, and a stable curtain is a practical necessity for the device to work at all. It has been found that the illustrated detector need not be used at right angles to the body to be tested, but can be used at any inclination that the curtain is stable when the detector is moved, and that the curtain even remains intact if the body has a local depression eg a blind gutter on a vehicle, beneath the curtain. The heat detector may be mounted as the head on a robot arm programmed to track around certain paths around the vehicle along which leaks may be detected.

Figure 2:
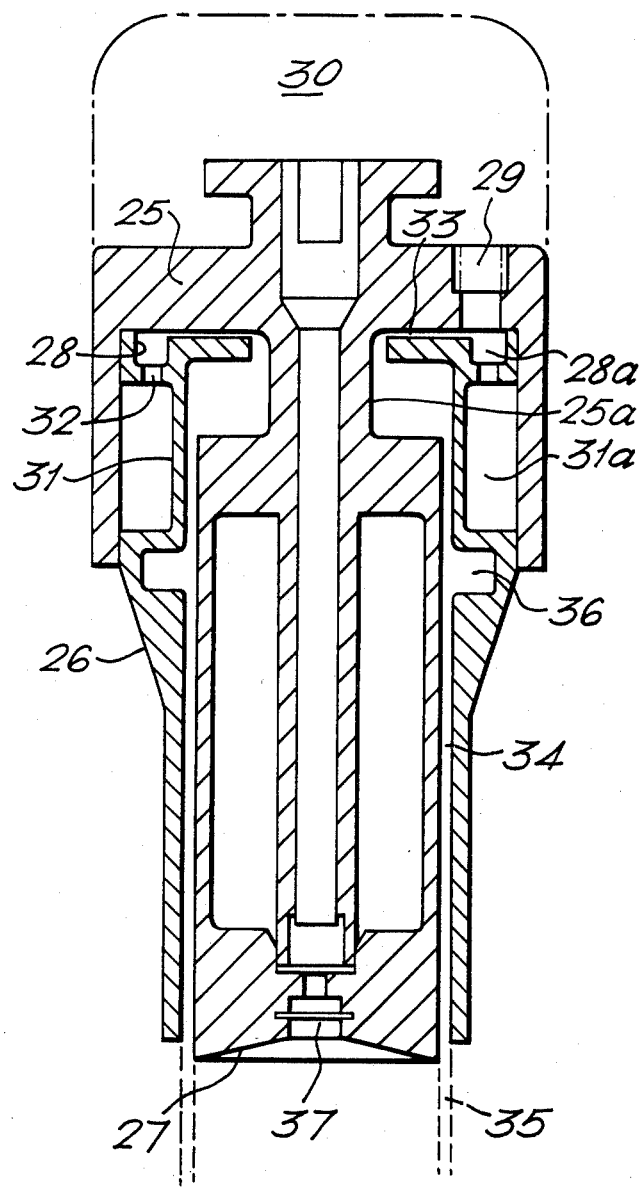
FIG. 2 is an axial cross-section through a second leak detector.

Referring to FIG. 2, the second leak detector comprises a body 25 to which both an inner sleeve 26 and an insert 27 are secured. The sleeve 26 has a groove 28 in its upper surface which defines an annular chamber 28a. This is fed with compressed gas via several drillings 29 equally spaced around the circumference of the device. The drillings 29 are in turn fed with compressed gas via a large chamber 30 to which a supply of compressed gas is fed (not shown).

A second groove 31 formed around the side of the sleeve 26 communicates at several points 32 equally spaced around the circumference of the groove with the annular chamber 28a. The annular chamber formed by the groove is of larger volume than the annular chamber 28a and acts as an accumulator.

The annular chamber 28a leads to a circumferential orifice 33. The combination of the chamber 30, the several drillings 29, and the accumulator 31a serve to ensure that barrier gas emerging from the orifice 33 has an equal mass flow rate at all points around the circumference of the orifice exit.

Equal mass flow rate into duct 34 at all points on its circumference therefore takes place. The flow impinges directly onto cylindrical section 25a of body 25 which causes turbulence in the flow. The flow is therefore highly turbulent after the orifice 33, but annular duct 34, which is symmetrical about the axis of the duct, produces substantially laminar flow out of the opening 35.

As with the first embodiment, the flow is substantially laminar, with an equal stagnation pressure and the same velocity profile, around the circumference of the opening 35 to produce a stable curtain with no weak points.

It has been found that the increased diameter portion 36 assists in the production of laminar flow.

As with the first embodiment, a probe 37 in the form of a capillary tube which is connected to a mass spectrometer may be used to sense the leaks, and the barrier gas may be air.

Typical dimensions are: axial length of duct 34, 4 inches; diameter of curtain, 1 inch; width of opening 35, 2 to 4 millimeters; and width of orifice, 10 to 50 thousandths of an inch. The detector can be used from 2 to 15 millimeters from a surface to be tested for leaks.

We claim:

1. A leak detector having a probe and a circular opening surrounding the probe through which circular opening a barrier gas can be fed, wherein there is provided: a relatively wide annular chamber having a plurality of inlet channels for entry of barrier gas spaced around its circumference or a continuous inlet channel around its circumference and having a plurality of outlet channels spaced around its circumference or a continuous outlet channels around its circumference, the inlet and outlet channel(s) being inclined to each other so no straight path exists through the inlet and outlet channel(s); a relatively narrow circumferential orifice which is coaxial with the annular chamber and communicates with the outlet channel(s); and an annular duct defined by inner and outer walls which is coaxial and in communication with the circumferential orifice, is symmetrical about the axis of the duct, and defines the circular opening.

2. A leak detector as claimed in claim 1 wherein the inclination between the inlet and outlet channel(s) is at least 90 degrees.

3. A leak detector as claimed in claim 1 wherein the width of the circumferential orifice is less than 50 thousandths of an inch (1.27 mm).

4. A leak detector as claimed in claim 1 wherein the width of the circumferential orifice is greater than 10 thousandths of an inch (0.254 mm).

5. A leak detector as claimed in claim 1 wherein a wall of the annular duct faces the end of the circumferential orifice where the circumferential orifice opens into the annular duct.

6. A leak detector as claimed in claim 1 wherein the diameter of the inner wall of the annular duct increases at a position towards the circular opening.

7. A leak detector as claimed in claim 1, wherein there is provided a second annular chamber having one or more inlet ports and a plurality of outlet ports spaced around its circumference or a continuous outlet port around its circumference, the second annular chamber being coaxial with and in communication with the first annular chamber.

8. A leak detector as claimed in claim 1 wherein at least a part of the outer wall of the annular duct is frustoconical with a semi-angle lying within the range $15°-45°$.

9. A leak detector as claimed in claim 8, wherein the diameter of the inner wall of the annular abruptly increases opposite the frustoconical part of the outer wall thereof.

10. A leak detector as claimed in claim 8 wherein at least part of the outer wall of the annular duct is cylindrical adjacent the circular opening.

11. A leak detector as claimed in claim 10, wherein the inner wall of the annular duct is frustoconical opposite the cylindrical part of the outer wall thereof so that the width of the duct decreases towards the circular opening in this region.

12. A leak detector as claimed in claim 1 wherein the detector is encased by a resilient sleeve are provided and means to thereby detect if the sleeve strikes an object to sense pressure increases within the sleeve.

* * * * *